United States Patent
Wu et al.

(10) Patent No.: US 10,932,419 B2
(45) Date of Patent: Mar. 2, 2021

(54) PLANT ILLUMINATION OPTICAL DEVICE AND PLANT CULTIVATION DEVICE CONTAINING OPTICAL DEVICE

(71) Applicant: FUJIAN SANAN SINO-SCIENCE PHOTOBIOTECH CO., LTD., Quanzhou (CN)

(72) Inventors: Chanjuan Wu, Quanzhou (CN); Liang Zeng, Quanzhou (CN); Pingqiu Lin, Quanzhou (CN); Yingying Chen, Quanzhou (CN); Fulin Feng, Quanzhou (CN); Zhuo Zhan, Quanzhou (CN)

(73) Assignee: FUJIAN SANAN SINO-SCIENCE PHOTOBIOTECH CO., LTD., Quanzhou (CN)

( * ) Notice: Subject to any disclaimer, the term of this patent is extended or adjusted under 35 U.S.C. 154(b) by 23 days.

(21) Appl. No.: 16/349,977

(22) PCT Filed: Dec. 25, 2018

(86) PCT No.: PCT/CN2018/123386
§ 371 (c)(1),
(2) Date: May 14, 2019

(87) PCT Pub. No.: WO2019/161706
PCT Pub. Date: Aug. 29, 2019

(65) Prior Publication Data
US 2020/0260652 A1    Aug. 20, 2020

(30) Foreign Application Priority Data
Feb. 23, 2018 (CN) .......................... 201810154596.9

(51) Int. Cl.
*F21V 5/04* (2006.01)
*A01G 7/04* (2006.01)
(Continued)

(52) U.S. Cl.
CPC .............. *A01G 7/045* (2013.01); *F21V 5/048* (2013.01); *F21V 7/005* (2013.01); *F21V 7/0066* (2013.01);
(Continued)

(58) Field of Classification Search
CPC ......... A01G 7/045; F21V 13/04; F21V 21/30; F21V 5/048; F21V 7/005; F21V 7/09;
(Continued)

(56) References Cited

U.S. PATENT DOCUMENTS

| 2012/0218757 A1 | 8/2012 | Gill | |
| 2013/0083539 A1* | 4/2013 | Dimitriadis | F21V 29/83 362/297 |
| 2015/0260384 A1* | 9/2015 | Purdy | H05B 45/10 362/221 |

FOREIGN PATENT DOCUMENTS

| CN | 202532279 U | * 11/2012 | ................ F21S 2/00 |
| CN | 202532279 U |   11/2012 | |

(Continued)

*Primary Examiner* — Donald L Raleigh
(74) *Attorney, Agent, or Firm* — Dragon Sun Law Firm, PC; Jinggao Li Esq.

(57) ABSTRACT

A plant illumination optical device includes two LED lamp bodies. Each of the LED lamp bodies includes a reflector and an LED lamp located at an inner side of the reflector, and an angle between the central light rays of the two LED lamp bodies is adjustable. A plant cultivation device contains the plant illumination optical device. The plant illumination optical device and the plant cultivation device can reflect the light beyond the planting area to the planting area and can supplement the illumination on both sides of the illumination centerline, thereby avoiding light waste, improving energy efficiency, improving the illumination uniformity in the planting area, and improving planting quality of the planting area.

11 Claims, 17 Drawing Sheets

(51) Int. Cl.
*F21V 7/00* (2006.01)
*F21V 7/09* (2006.01)
*F21V 13/04* (2006.01)
*F21V 21/30* (2006.01)
*F21Y 103/10* (2016.01)
*F21Y 115/10* (2016.01)
*F21V 17/08* (2006.01)
*F21V 17/10* (2006.01)
*F21V 17/12* (2006.01)

(52) U.S. Cl.
CPC ................ *F21V 7/09* (2013.01); *F21V 13/04* (2013.01); *F21V 21/30* (2013.01); *F21V 17/08* (2013.01); *F21V 17/101* (2013.01); *F21V 17/12* (2013.01); *F21Y 2103/10* (2016.08); *F21Y 2115/10* (2016.08)

(58) Field of Classification Search
CPC ...... F21V 7/0066; F21V 17/101; F21V 17/08; F21V 17/12; F21Y 2103/10; F21Y 2115/10
See application file for complete search history.

(56) References Cited

FOREIGN PATENT DOCUMENTS

| | | |
|---|---|---|
| CN | 204534361 U | 8/2015 |
| CN | 205299391 U | 6/2016 |
| CN | 106545788 A | 3/2017 |
| CN | 108224247 A | 6/2018 |
| CN | 108534007 A | 9/2018 |
| KR | 100936942 B1 | 1/2010 |
| KR | 20130056775 A | 5/2013 |

* cited by examiner

PLANT ILLUMINATION OPTICAL DEVICE AND PLANT CULTIVATION DEVICE CONTAINING OPTICAL DEVICE

CROSS REFERENCE TO THE RELATED APPLICATIONS

This application is the national phase entry of International Application No. PCT/CN2018/123386, filed on Dec. 25, 2018, which is based upon and claims priority to Chinese Patent Application No. 201810154596.9, filed on Feb. 23, 2018, the entire contents of which are incorporated herein by reference.

TECHNICAL FIELD

The present invention relates to the field of plant illumination technology, and particularly to a plant illumination optical device and a plant cultivation device containing the optical device.

BACKGROUND

At present, in the field of agriculture, economic efficiency can be improved through intensive planting, for example, making full use of the space to increase the planting area. The light source for plant illumination is one of the bottlenecks of intensive planting.

Generally, the light source of the plant illumination optical device is a thermal source, such as a high voltage sodium lamp. The thermal source would cause severe infrared radiation and generate a large amount of heat, which not only consumes a lot of energy, but also leads to a low space utilization because it should be installed above the plants in a far distance to avoid the influence of the high temperature generated by the lamp on the plants.

In addition, the plant illumination optical device available now no matter using high voltage sodium lamps or other thermal sources, has a problem that the central luminous intensity is stronger than the luminous intensity on both sides, and the luminous intensity distribution is uneven, thereby affecting the quality of plants.

SUMMARY

In view of the above-mentioned drawbacks of the prior art, the objective of the present invention is to provide a plant illumination optical device, which can save planting space, reflect the light beyond the planting area back to the planting area, and can supplement the illumination on both sides of the centerline of the planting area, thereby reducing light waste, improving energy efficiency, and improving planting quality of the planting area.

In the first aspect, the present invention provides a plant illumination optical device, including two LED lamp bodies. Each of the LED lamp bodies includes a reflector and an LED lamp located at an inner side of the reflector, and an angle between central light rays of the two LED lamp bodies is adjustable.

In an embodiment of the present invention, the angle between the central light rays of the two LED lamp bodies is in a range of 0°-20°.

In an embodiment of the present invention, the LED lamp body further includes a lens; the lens is configured at an inner top end of the reflector and covers a light emitting surface of the LED lamp.

In an embodiment of the present invention, the lens has a symmetrical structure.

In an embodiment of the present invention, the LED lamp and the reflector are fixed on one side of an angle adjustable support through a housing; or, the LED lamp body is fixed on one side of the support by an angle adjustable mechanism.

In the second aspect, the present invention provides a plant cultivation device containing the plant illumination optical device described in the first aspect.

The plant illumination optical device and the plant cultivation device provided by the present invention can provide illumination for plants in a close range, which saves planting space, can reflect light beyond the planting area back to the planting area, and can supplement the illumination on both sides of the illumination centerline, thereby reducing light waste, improving energy efficiency, improving the uniformity of illumination in the planting area, and improving planting quality of the planting area.

DETAILED DESCRIPTION OF THE EMBODIMENTS

Before the embodiments of the present invention are further described, it should be understood that the protective scope of the present invention is not limited to the specific embodiments described below. It should also be understood that the terminologies used in the embodiments of the present invention are intended to describe particular specific embodiments, rather than limit the protective scope of the present invention. In the specification and claims of the present invention, the singular forms "an/a", "one", and "this/the" include the plural forms unless otherwise expressly stated in the context.

When a numerical range is given in the embodiment, it should be understood that, unless otherwise specified in the present invention, two endpoints of every numerical range and any value falling within the two endpoints are acceptable. Unless otherwise defined, all technical and scientific terminologies used in the present invention have the same meaning as those commonly understood by those skilled in the art. In addition to the specific methods, devices and materials used in the embodiments, any methods, devices and materials available in the prior art similar or equivalent to the methods, devices and materials described in the embodiments of the present invention can be used to realize the present invention, according to the mastery of the prior art by those skilled in the art and the disclosure of the present invention.

An LED lamp is a light source composed of one or more light emitting diodes (LEDs). LEDs can convert electrical energy into light energy. Therefore, the LED lamp is a cold light source which generates a small amount of heat, and can be used for plant illumination in a close distance, so as to save planting space. Further, by using the LED lamps, the planting area can be increased and the economic benefits for crop planting can be improved.

The LED lamp 1 (see FIG. 2) is small in size and can be approximately considered as a point light source with a large angle of half luminous intensity, also known as a Lambertian LED lamp. In other words, the optical properties of the LED lamp include the 180-degree light emitting and the strongest luminous intensity of the central light ray. The luminous intensity of the light rays on both sides are getting weaker with the increase of the angle.

Figure 1:
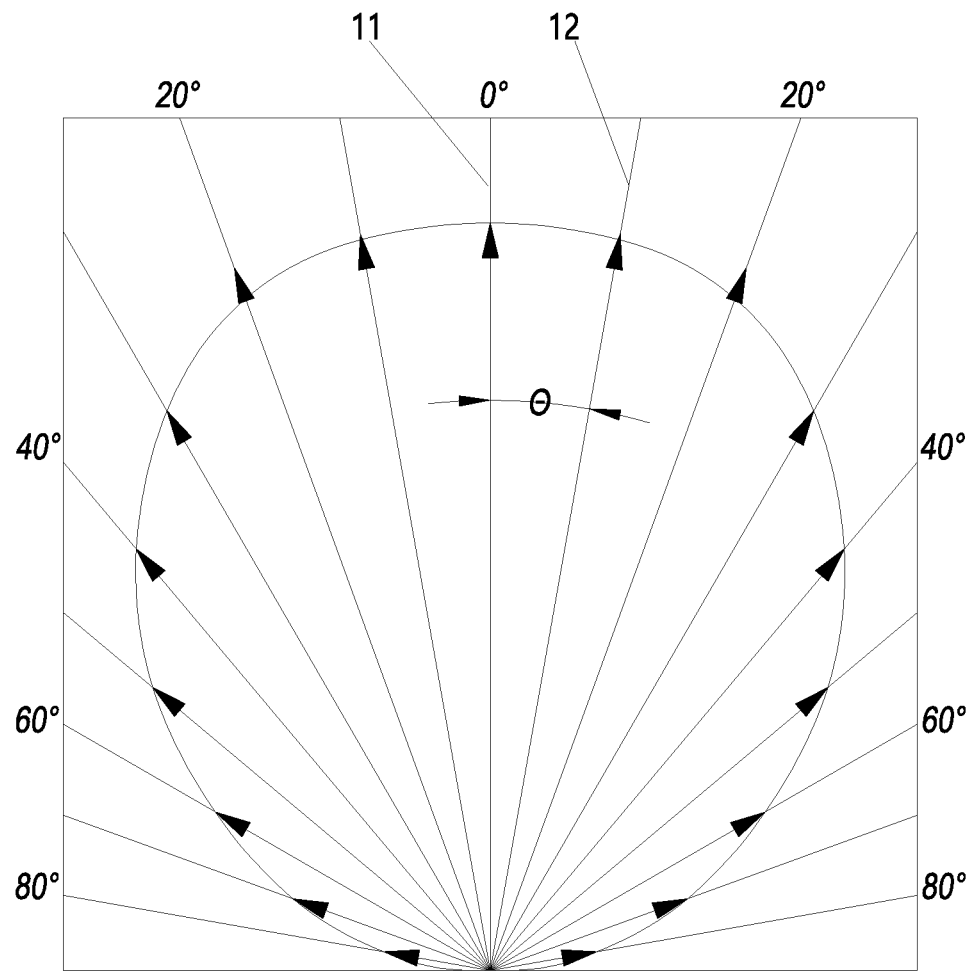
FIG. 1 is a curve graph of light distribution when LED lamps are used alone.

In the absence of reflector 2, the light distribution curve of the LED lamp is shown in FIG. 1. In FIG. 1, the angle of the central light ray 11 of the LED lamp 1, i.e., the light ray perpendicular to the light emitting surface of the LED lamp, is 0°. The luminous intensity $I_\theta$ of the light ray 12 of the Lambertian LED lamp with an angle of $\theta$ is equal to the luminous intensity $I_0$ the central light ray 11 of the Lambertian LED lamp multiplied by the cosine of the direction angle, that is, $I_\theta = I_0 \cos \theta$.

Figure 2:
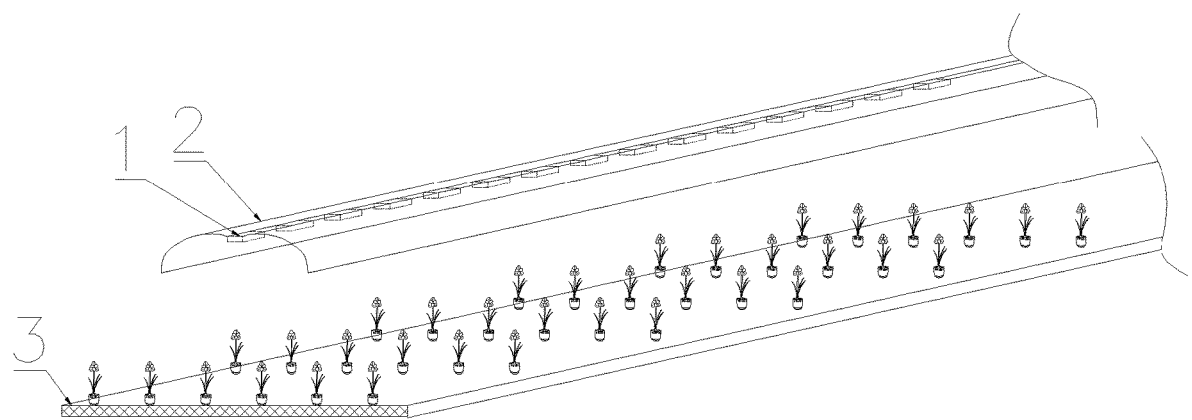
FIG. 2 is a schematic diagram showing a three-dimensional structure of a plant illumination optical device according to one embodiment of the present invention.

Obviously, if only LED lamps are used for plant illumination, there is a large difference in the luminous intensities received at different locations in the planting area 3 (see FIG. 2). Generally, the plant illumination lamp is placed above the planting area 3 at the center or the centerline position, and the luminous intensity received at the center or centerline position of the planting area 3 is much greater than the luminous intensity received at the two sides, so that the yields of different plants in the planting area 3 are different, or the qualities are different, thereby affecting the economic benefits.

In addition, since the illumination angle of the LED lamp 1 is relatively large, i.e. 180° or close to 180°, a part of the light rays emitted by the LED lamp 1 are irradiated at areas outside the planting area 3, and this part of the light rays is called out-of-edge light rays. The out-of-edge light rays cannot be used by the plants in the planting area 3, thereby causing light waste and low energy efficiency.

In view of the above situation, one embodiment of the present invention provides a plant illumination optical device. As shown in FIG. 2, the plant illumination optical device includes an LED lamp body, and the LED lamp body includes an LED lamp 1 and a reflector 2. The reflector 2 can reflect the out-of-edge light rays of the LED lamp 1 back to the planting area 3, so that the out-of-edge light rays can be utilized by the plants in the planting area 3.

The reflector 2 has a curved structure, and the path of the out-of-edge light ray are controlled by controlling the curvature and normal direction of the reflector 2 to reflect the out-of-edge light ray to the planting area 3. Further, by reflecting the out-of-edge light ray to the area of the planting area 3 with relatively weak luminous intensity, not only the light waste is reduced, but also the energy utilization rate is improved. Meanwhile, the illumination of the area of the planting area 3 with relatively weak light is enhanced, which allows the entire planting area 3 to receive a more uniform illumination, thereby enhancing the quality consistency of the plants in the planting area 3.

In the plant illumination optical device shown in FIG. 2, the LED lamp body can include a single LED lamp 1 or a plurality of LED lamps 1. Moreover, the plurality of LED lamps 1 are arranged in a row along the length direction.

The plant illumination optical device provided in this embodiment has an LED lamp body, and a cut surface of the plant illumination optical device has a single LED lamp 1. The LED lamp 1 is configured at an inner side of the reflector 2. Preferably, the LED lamp 1 is configured at the center position at the inner side of the reflector 2. The LED lamp 1 is provided at a preset position above the center area or the centerline of the planting area 3, and the vertical distance from the preset position to the plants in the planting area 3 is H. The width of the planting area 3 is W, where H can be less than or equal to ½ W.

The structure of the reflector 2 according to the embodiment of the present invention will be described in detail with reference to FIGS. 3 and 4, hereinafter.

Figure 3:
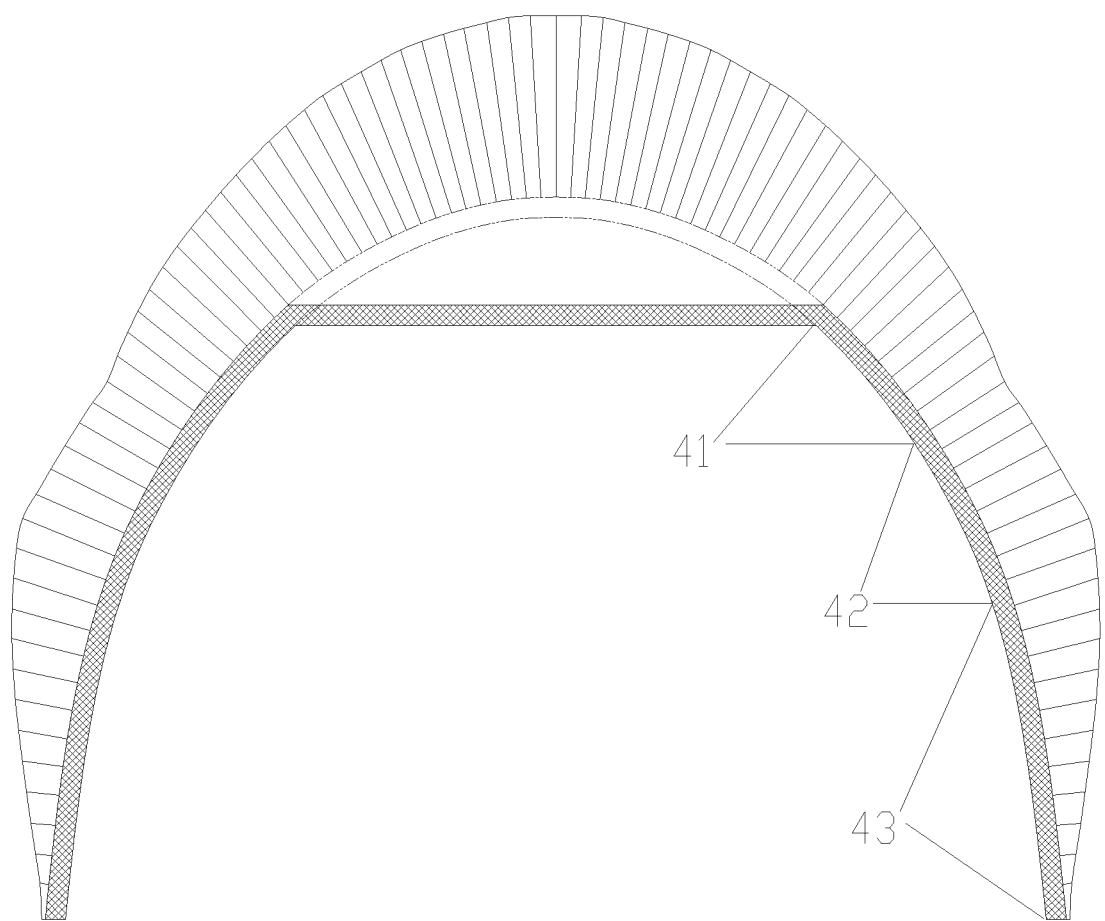
FIG. 3 is a structural schematic diagram showing the cross section of the reflector shown in FIG. 2.
Figure 4:
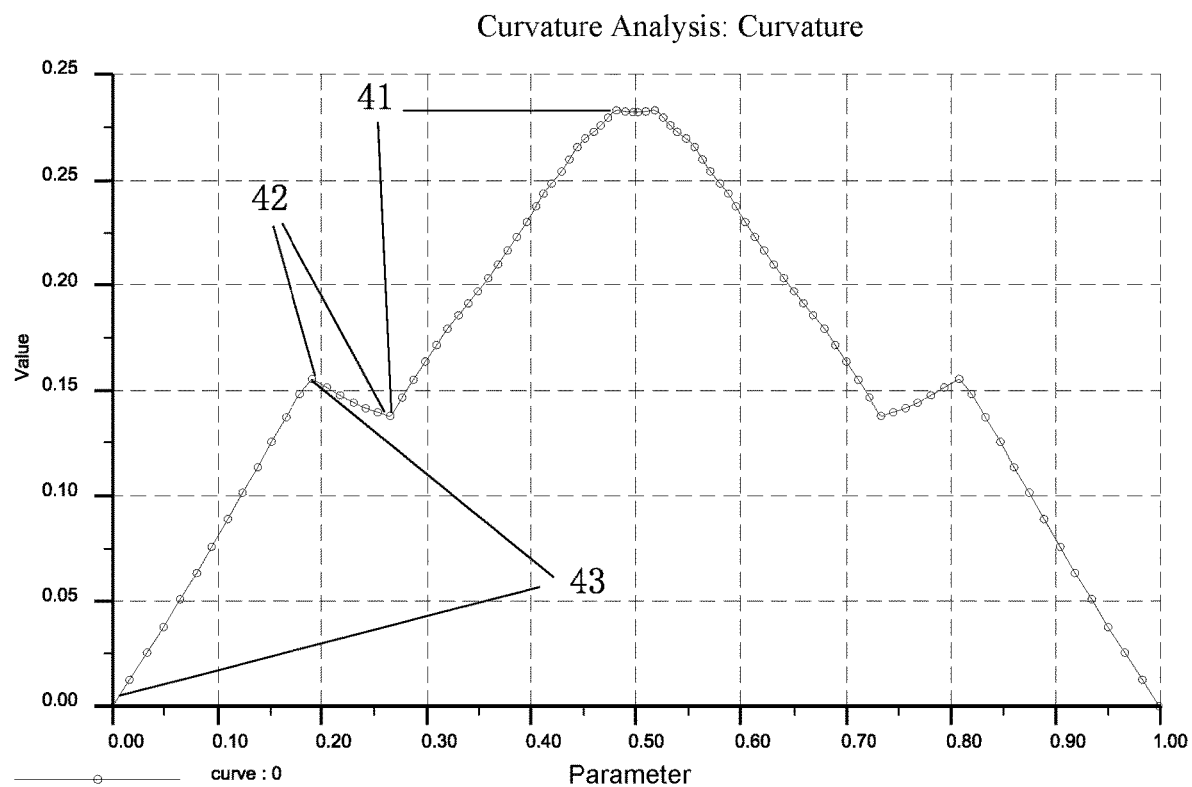
FIG. 4 is a schematic diagram showing the curvature variation of the reflector shown in FIG. 2.

As shown in FIG. 3, the reflector 2 has a symmetrical structure, and the structure of one side of the reflector 2 will be introduced below. The structure of this side of the reflector 2 can be divided into a first segment 41, a second segment 42, and a third segment 43 from the highest reflection point to the lowest reflection point. In the direction from the highest reflection point to the lowest reflection point, the curvature of the first segment 41 gradually decreases, the curvature of the second segment 42 variates from small to large, and the curvature of the third segment 43 variates from large to small. FIG. 4 is an example of specific variations in curvatures of the first segment 41, the second segment 42, and the third segment 43. The abscissa in FIG. 4 indicates the relative position of all the parts of the reflector 2, starting from one end (the abscissa of this end in FIG. 4 is 0) and ending at the other end (the abscissa of this end in FIG. 4 is 1). The ordinate in FIG. 4 represents the relative value of the curvature value corresponding to each point of the curve.

The structure of the other side can be implemented with reference to above description.

The outgoing light angle of the optical device provided by the present invention is an angle of light for which the luminous intensity is half that of the maximum luminous intensity at the center. Namely, extending from the central normal line of the light source to the surroundings, the angle between the position with half luminous intensity and the coordinate center is an angle of half intensity, also known as a beam angle.

Figure 5:
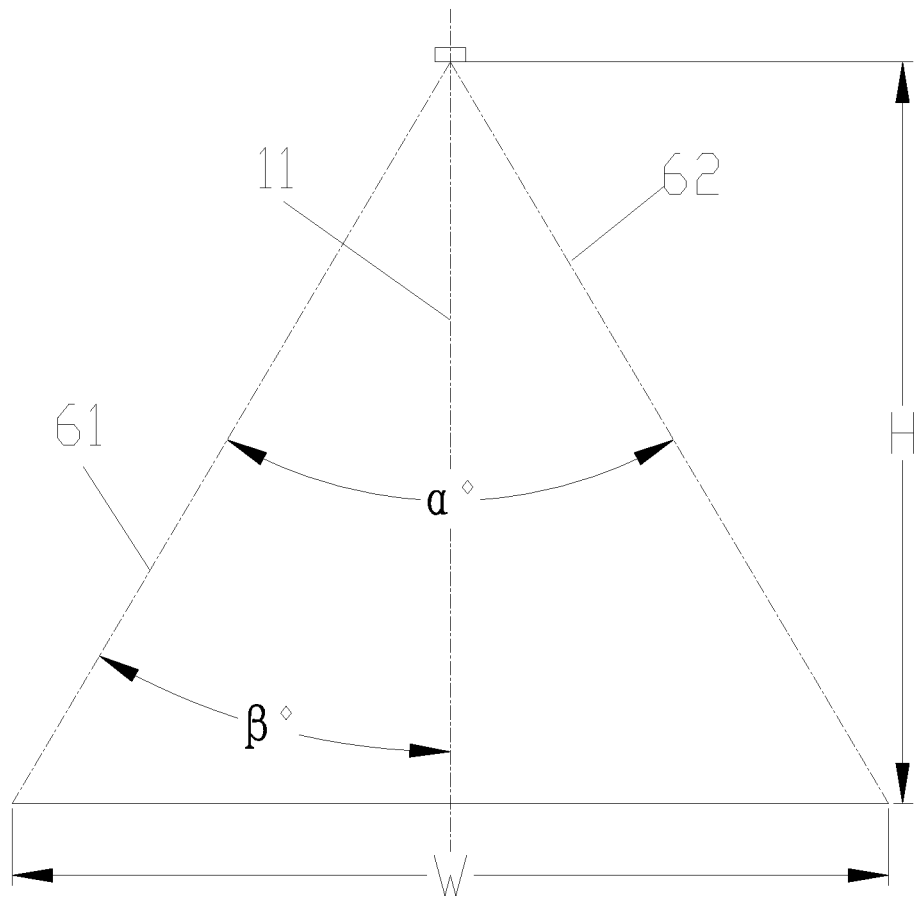
FIG. 5 is a schematic diagram showing the relationship between the angle of half luminous intensity of the plant illumination optical device shown in FIG. 2 and the width of the planting area.
Figure 6:
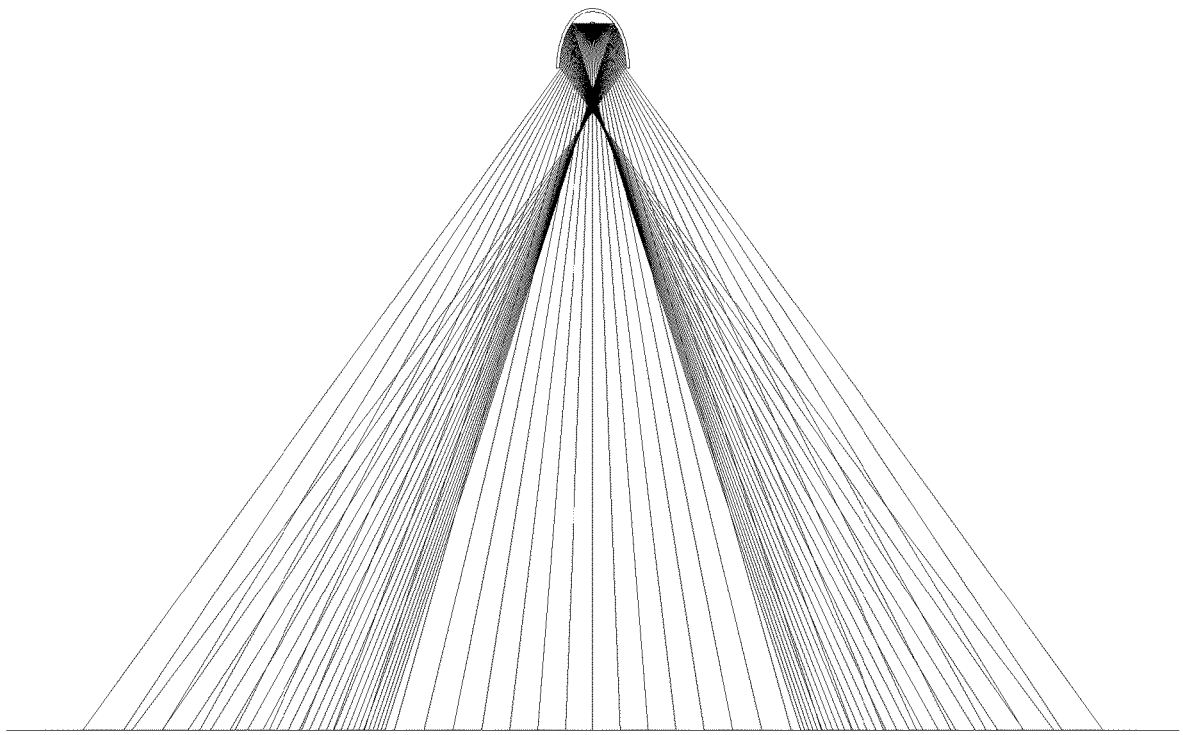
FIG. 6 is a schematic diagram showing the working principle of a plant illumination optical device according to one embodiment of the present invention.

FIG. 5 is a schematic diagram showing the relationship between the angle of half intensity of the optical device provided by the present invention and the width of the planting area 3. The angle between the first light ray of half intensity 61 of the optical device provided by the present invention and the second light ray of half intensity 62 of the optical device 1 provided by the present invention is $\alpha$. Obviously, the angle between the first light ray of half intensity 61 or the second light ray of half intensity 62 and the center light ray 11 is $\beta=\frac{1}{2}\alpha$. H is the vertical height from the LED lamp 1 of the optical device provided by the present invention to the planting area, and W is the width of the planting area. When H*tan $\beta\approx\frac{1}{2}$ w, the light radiates the planting area to a maximum extent with a high light utilization rate. Moreover, the reflector 2 provided by the embodiment of the present invention can reflect the side light with a luminous intensity less than that of the central light ray 11 to the planting area 3, as shown in FIG. 6, thereby reducing light waste.

Figure 7:
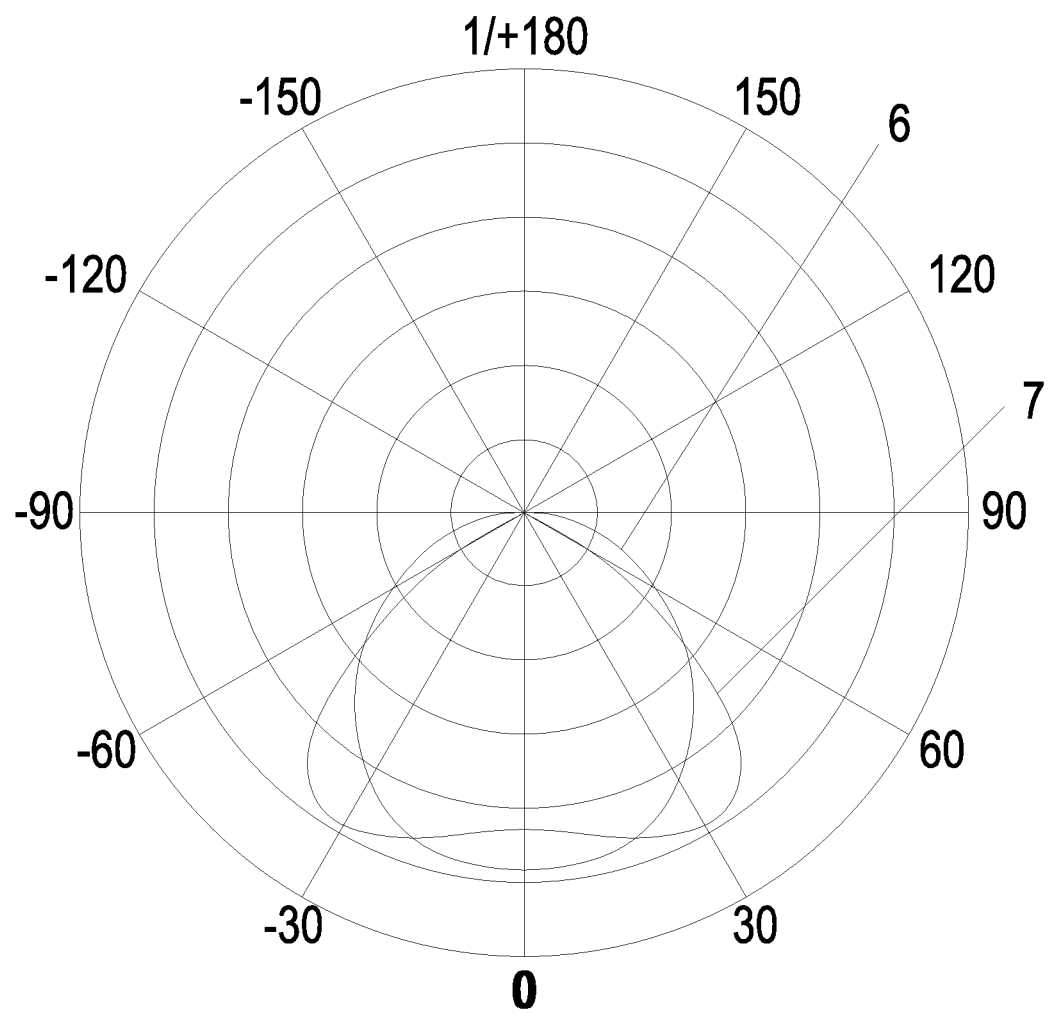
FIG. 7 is a comparison diagram of a light distribution curve of a plant illumination optical device and a light distribution curve of a LED lamp used alone according to one embodiment of the present invention.
Figure 8:
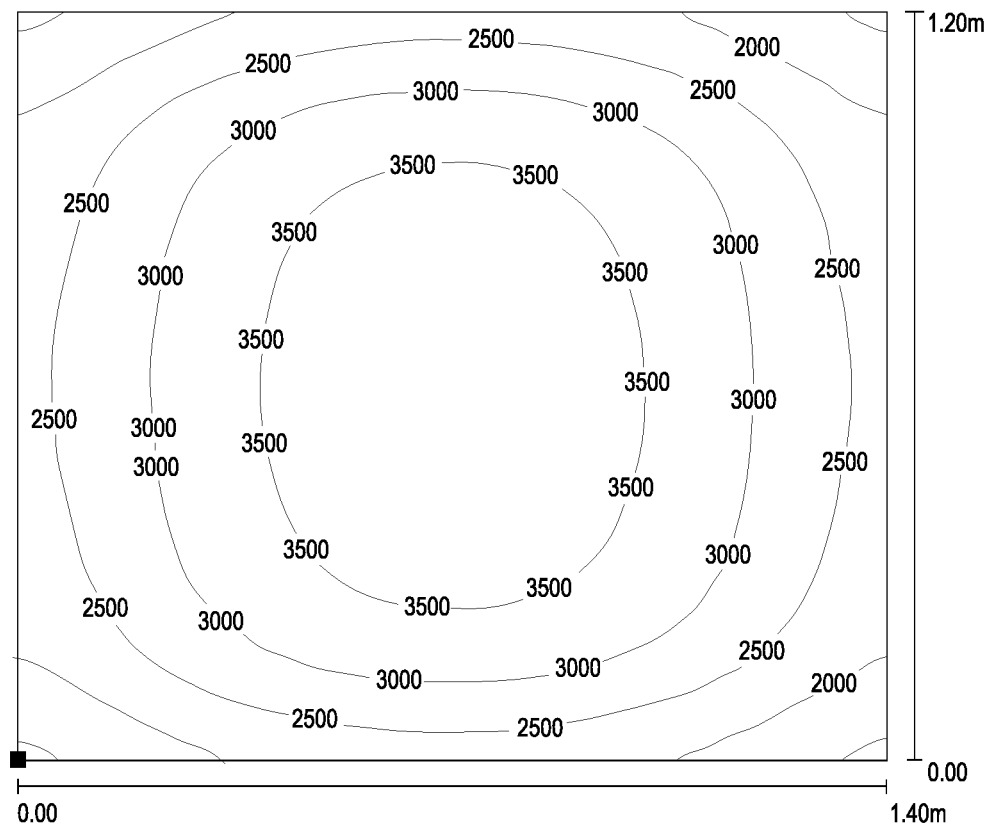
FIG. 8 is a diagram showing a luminous intensity of a light emitting surface of a plant illumination optical device according to one embodiment of the present invention.

The advantages of the plant illumination optical device provided by this embodiment can be as shown in FIGS. 7 and 8. In the drawings, the first curve 6 is the light distribution curve of the LED lamp 1 without the reflector 2. The second curve 7 is the light distribution curve of the plant illumination optical device provided by this embodiment. It can be known that the plant illumination optical device provided by this embodiment can significantly improve the illumination uniformity of the planting area 3.

The plant illumination optical device provided by this embodiment can be used to illuminate plants in a close range, thereby saving planting space and increasing planting area by providing more layers of planting areas within a unit height. Moreover, the out-of-edge light ray can be reflected back to the planting area. Further, the out-of-edge light ray can be reflected to the area with relatively weak luminous intensity in the planting area.

Another embodiment of the present invention provides a plant illumination optical device. The plant illumination optical device includes two LED lamp bodies. A cross section of the plant illumination optical device has two LED lamps 1 and two reflectors 2. The two LED lamps 1 are respectively configured at the center position of the inner side of the two reflectors 2. The two reflectors 2 are symmetrically placed above the centerline of the planting area 3. Namely, in this embodiment, two LED lamp bodies of the plant illumination optical device provided by the previous embodiment are symmetrically arranged above the centerline of the planting area 3.

The reflectors 2 in this embodiment can be implemented by referring to the previous embodiment and are not repeated here again.

Figure 9:
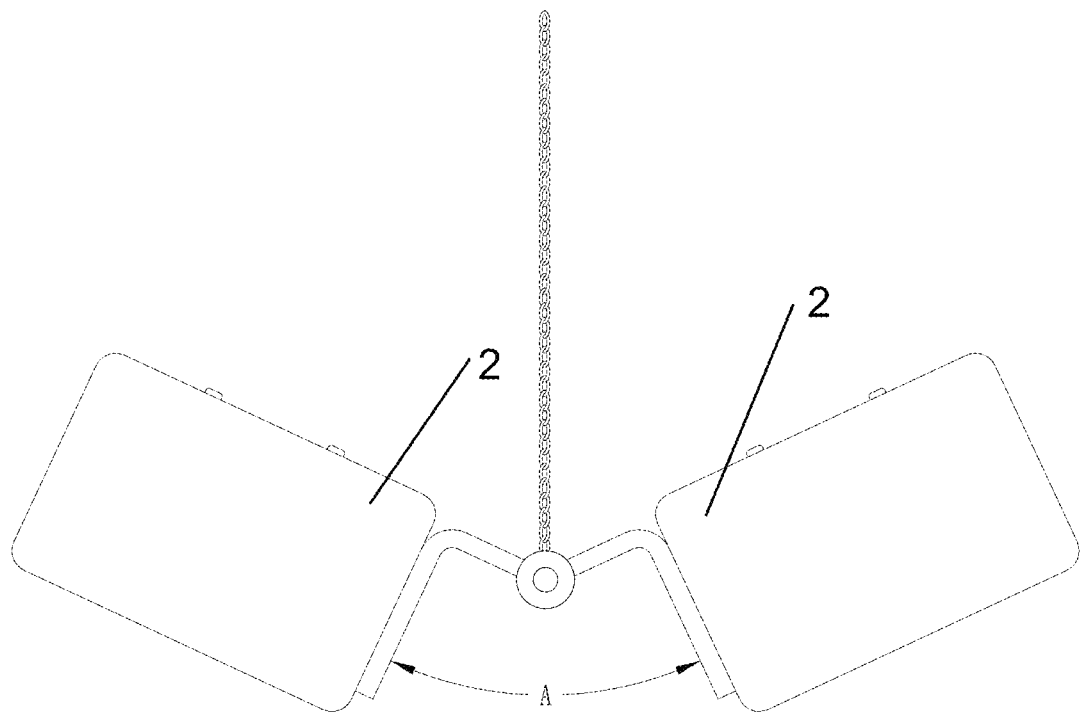
FIG. 9 is a schematic diagram showing an angle between two reflectors of a plant illumination optical device according to another embodiment of the present invention.

As shown in FIG. 9, the angle A between the two reflectors 2 can be adjusted according to the width of the planting area and the height of the LED lamps. Namely, the angle between the central light rays of the two LED lamp bodies can be adjusted. In order to reduce the light that irradiates outside the planting area while ensure the illumination uniformity in the planting area, under a condition of defined installation height and planting width, an optimum illumination effect can be achieved by adjusting the angle A within the range from 0° to 20°.

Figure 10:
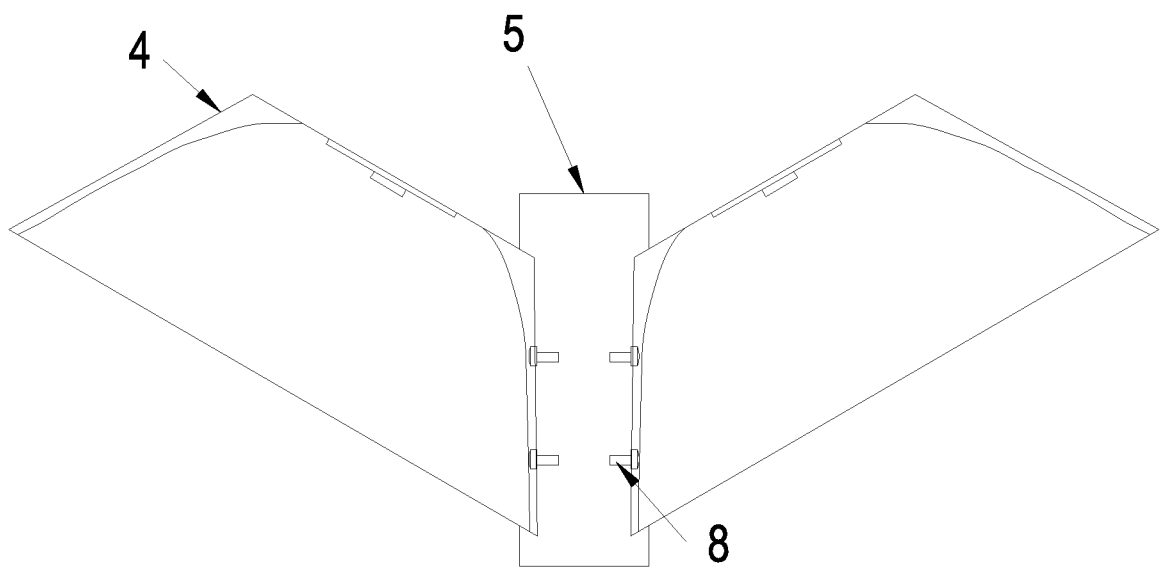
FIG. 10 is a structural schematic diagram showing a front view of a plant illumination optical device according to another embodiment of the present invention.
Figure 11:
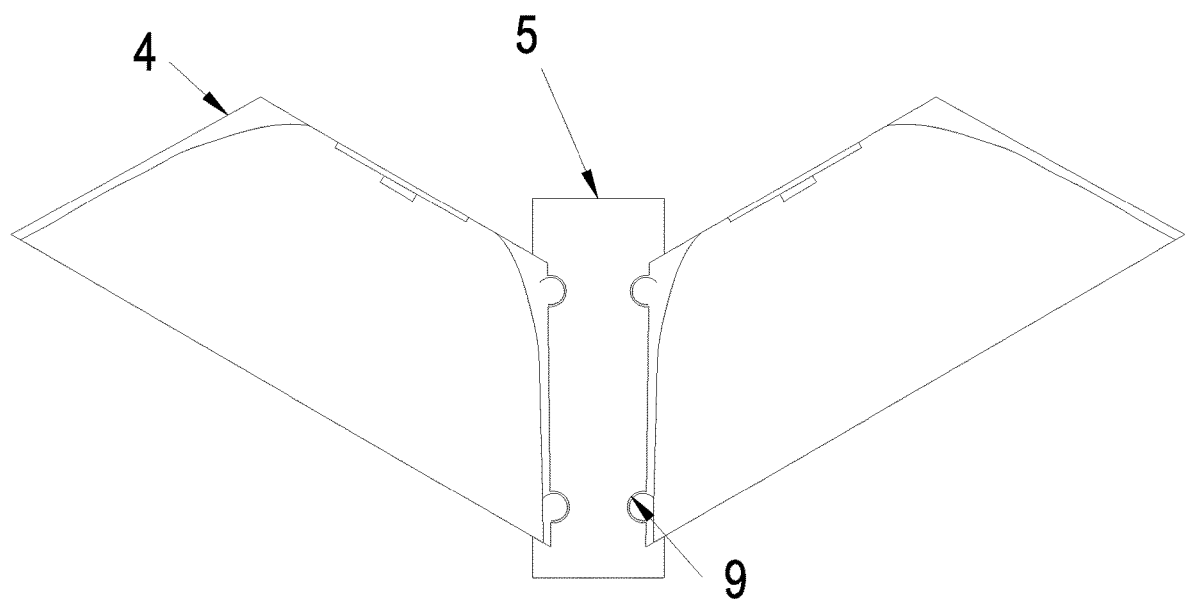
FIG. 11 is a structural schematic diagram showing a front view of an alternative implementation mode of the embodiment shown in FIG. 10.
Figure 12:
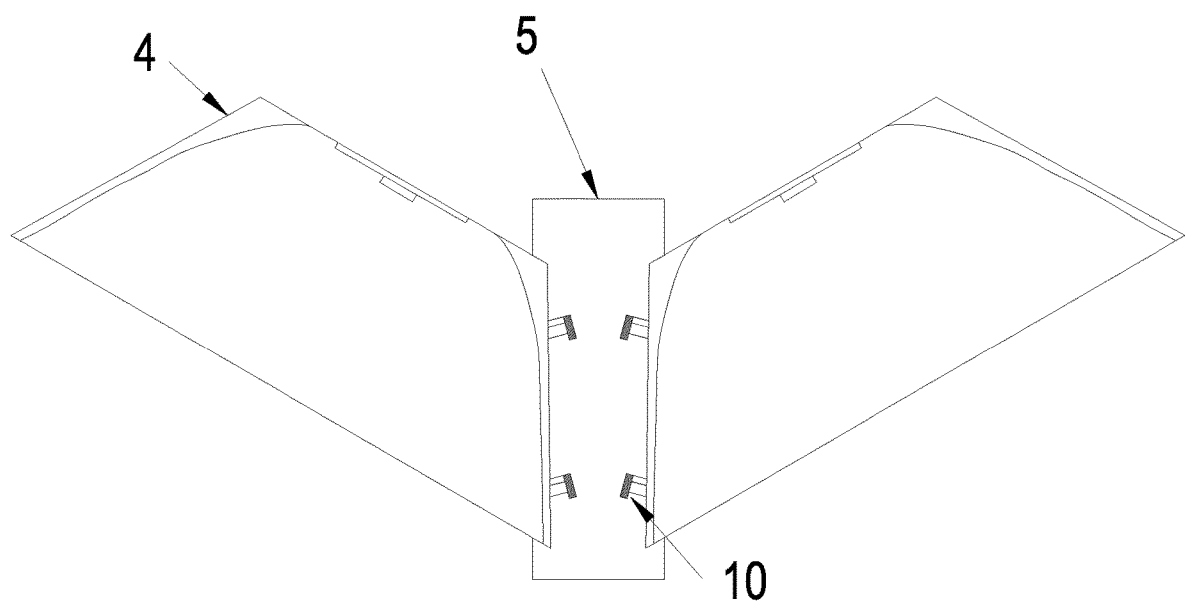
FIG. 12 is a structural schematic showing a front view of another alternative implementation mode of the embodiment shown in FIG. 10.

The LED lamp 1 and the reflector 2 can be fixed in a housing 4. Specifically, the housing 4 has an opening which allows the light emitted from the LED lamp 1 and the light reflected by the reflector 2 to pass. The housing 4 is fixed on a support 5. Specifically, the housing 4 can be fixed on one side of the support 5 by an angle adjustable mechanism. As shown in FIG. 10, the housing 4 is fixed on the support 5 by screws 8. Also, as shown in FIG. 11, the housing 4 is fixed on the support through a ball fastening connection 9 and an end cover threaded connection. As shown in FIG. 12, the housing 4 is fixed on the support 5 through the push-pull assembly 10 and adhesive. The housing 4 may also be fixed on one side of an angle adjustable support. As shown in FIG. 9, the LED lamp and the reflector are respectively fixed on the two supports through the housing, and the two supports can rotate relatively to form angle adjustable supports, so as to facilitate the adjustment of the angle A.

Figure 13:
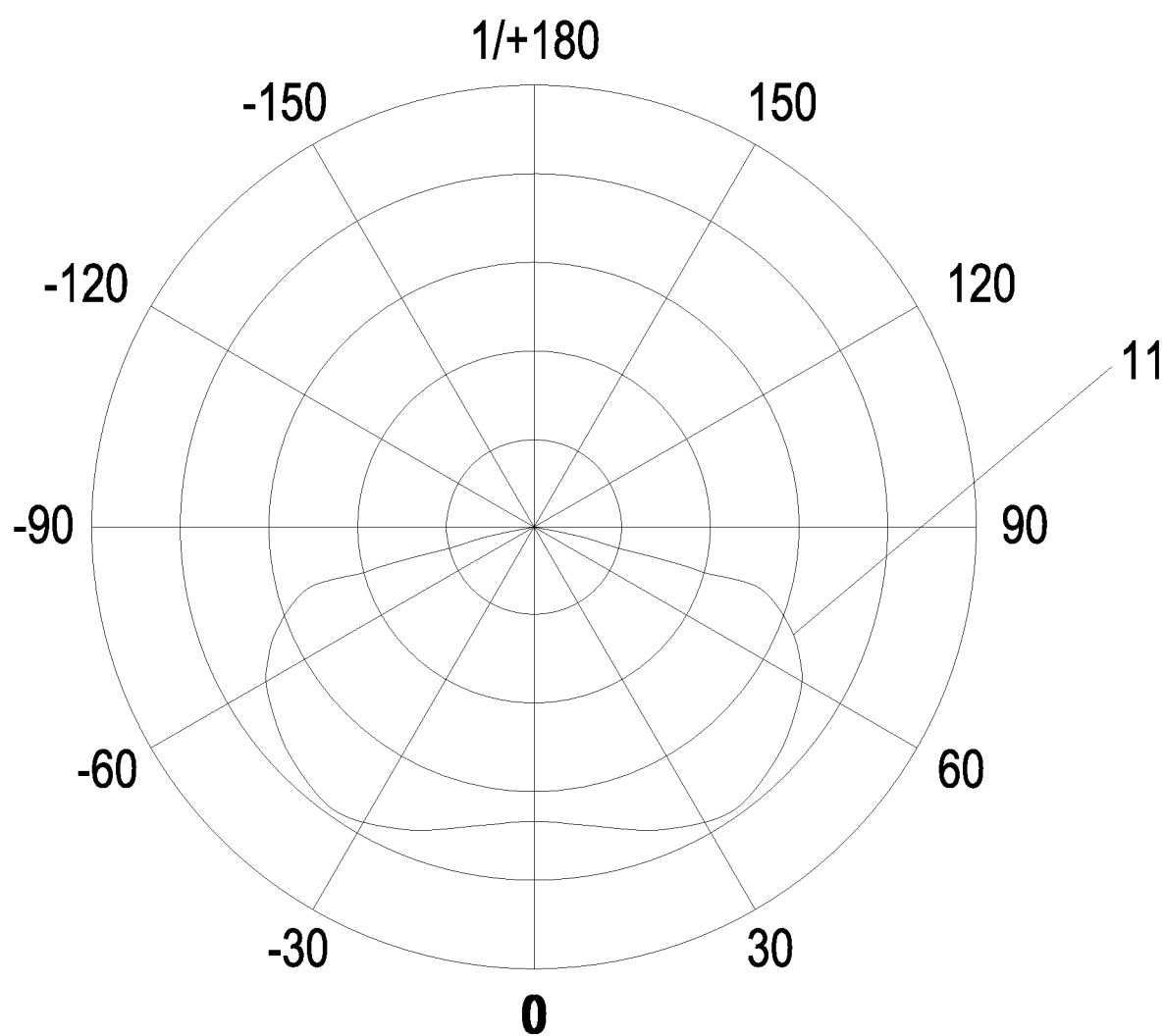
FIG. 13 is a curve graph showing the light distribution of the plant illumination optical device shown in FIG. 10.
Figure 14:
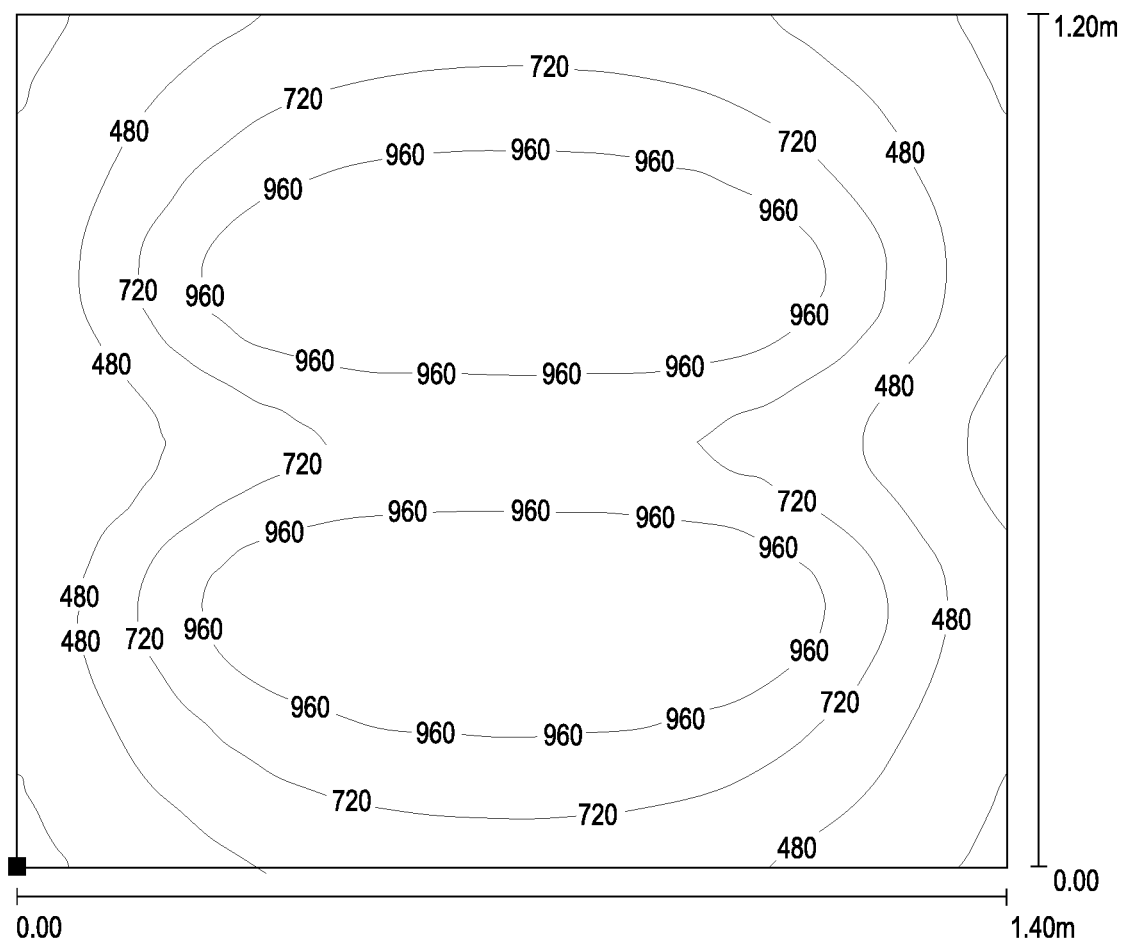
FIG. 14 is a diagram showing a luminous intensity of a light emitting surface of a plant illumination optical device shown in FIG. 10.

The advantages of the plant illumination optical device provided in this embodiment may be shown in FIGS. 13 and 14. The third curve 11 is the light distribution curve of the plant illumination optical device provided in this embodiment. It can be known that the plant illumination optical device provided by this embodiment can significantly improve the illumination uniformity of the planting area 3.

The plant illumination optical device provided by this embodiment can be used to illuminate plants in a close range, so as to save planting space and increase planting area by providing more layers of planting areas within a unit height. Moreover, the out-of-edge light ray can be reflected back to the planting area. Further, the out-of-edge light ray can be reflected to the area with relatively weak luminous intensity in the planting area.

Yet, another embodiment of the present invention provides a plant illumination optical device. The plant illumination optical device includes one or two LED lamp bodies, and each LED lamp body includes an LED lamp 1 (see FIG. 2), a reflector 2 (see FIG. 2) and a lens (not shown). The LED lamp 1 is configured at the center position of the inner side of the reflector 2, and the lens is configured at the top end of the inner side of the reflector 2 and covers the light emitting surface of the LED lamp 1.

The reflectors 2 can be implemented by referring to the foregoing embodiments and are not repeated here again.

The arrangement of the two LED lamp bodies can be implemented by referring to the foregoing embodiments and is not repeated here again.

Figure 15:
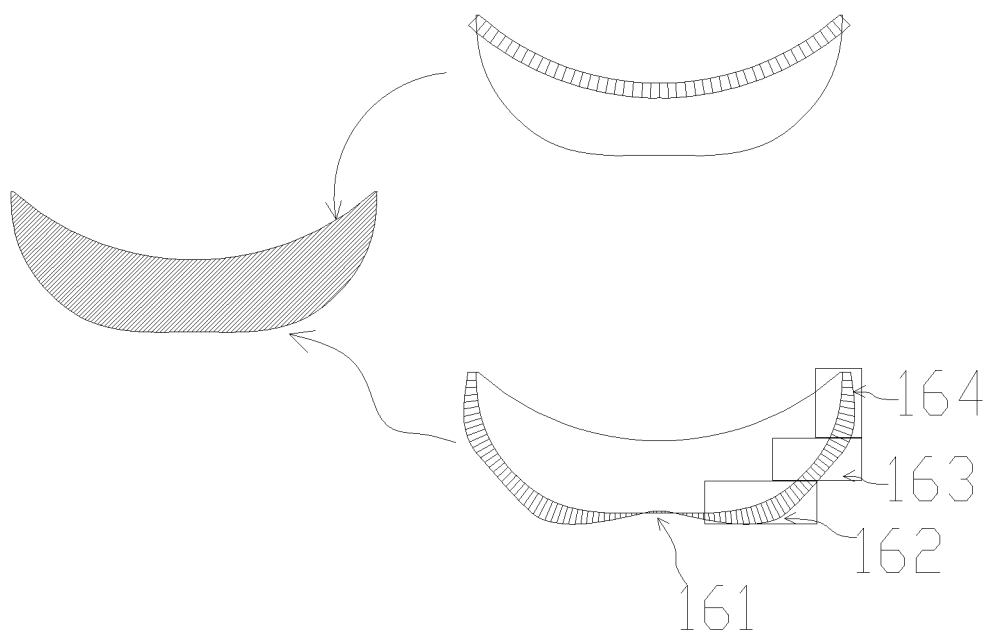
FIG. 15 is a structural schematic diagram of a lens of a plant illumination optical device according to yet another embodiment of the present invention.
Figure 16:
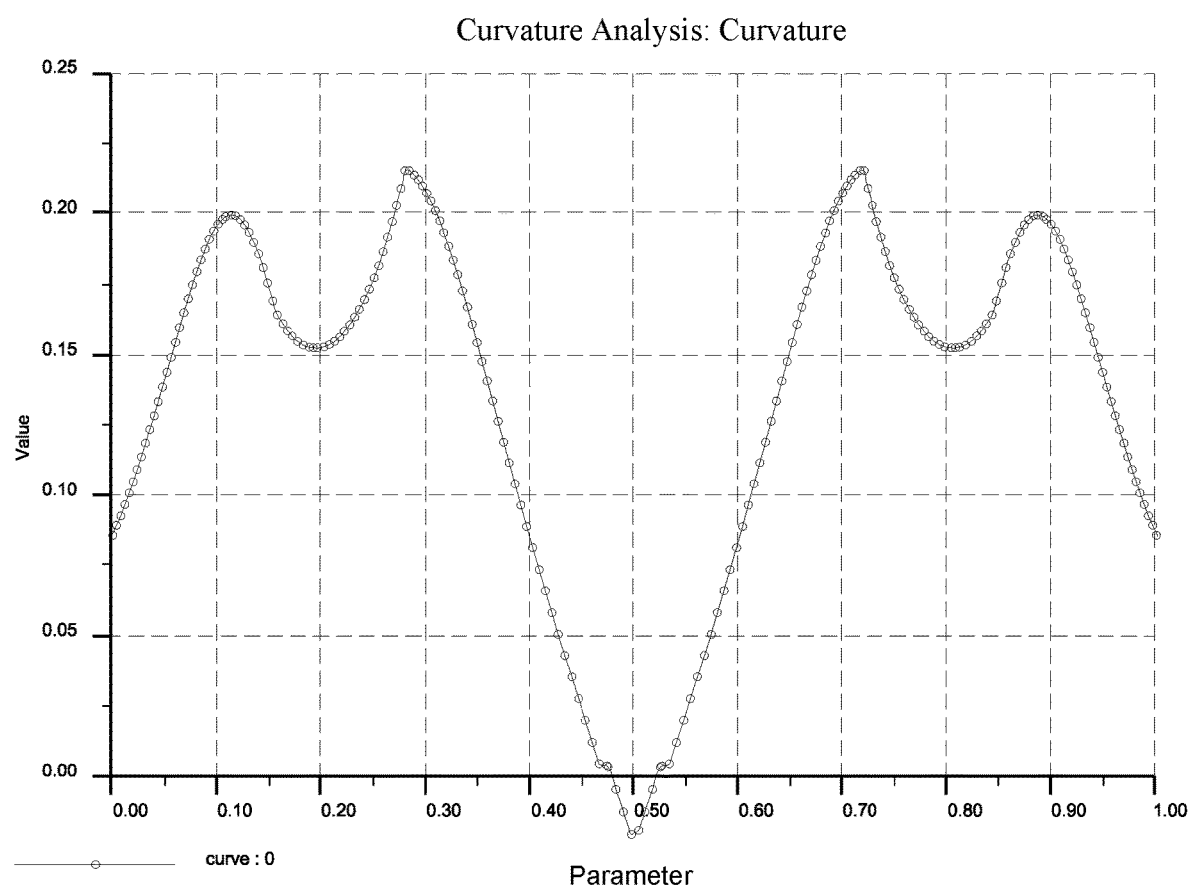
FIG. 16 is a schematic diagram showing the curvature variation of a side of the lens shown in FIG. 15 facing away from the LED lamps.

The structure of the lens is shown in FIG. 15. The inner side surface of the lens is concave and has the uniform curvature, so that the incident light has a uniform angular change after entering the lens and converges at the center. The outer side surface of the lens has a symmetrical structure. The central portion 161 has a negative curvature (which means that the central portion 161 is concave inward) and forms a concave lens in cooperation with the corresponding inner side surface. From the center portion to one end, there are three parts, i.e. a fourth segment 162, a fifth segment 163, and a sixth segment 164. By forming a concave lens on the center of the outer side surface of the lens, the luminous intensity of the center is reduced, and the light is decentralized to the two sides from the center to increase the luminous intensities of the two sides. From the center portion 161 to one end, the curvature of the fourth segment 162 increases gradually, and has a function of a convex lens, which can converge the light on the sides. The curvature of the fifth segment 163 is first reduced and then increased, thereby adjusting the angle of the outgoing light, so that the corresponding position in the planting area 3 can uniformly receive the outgoing light here. The curvature of the sixth segment 164 decreases gradually, so that the side light emitted by the LED lamp 1 converges inward. FIG. 16 is an example showing the specific curvature variations of the central portion 161, the fourth segment 162, the fifth segment 163, and the sixth segment 164. The abscissa in FIG. 16 indicates the relative position of all the parts of the outer side surface of the lens, starting from one end (the abscissa of this end in FIG. 16 is 0) and ending at the other end (the abscissa of this end in FIG. 16 is 1). The ordinate in FIG. 16 represents the relative value of the curvature value corresponding to each point of the curve.

In this embodiment, the inner side surface of the lens is the surface facing the LED lamp 1, and the outer side surface of the lens is the surface facing away the LED lamp 1.

Figure 17:
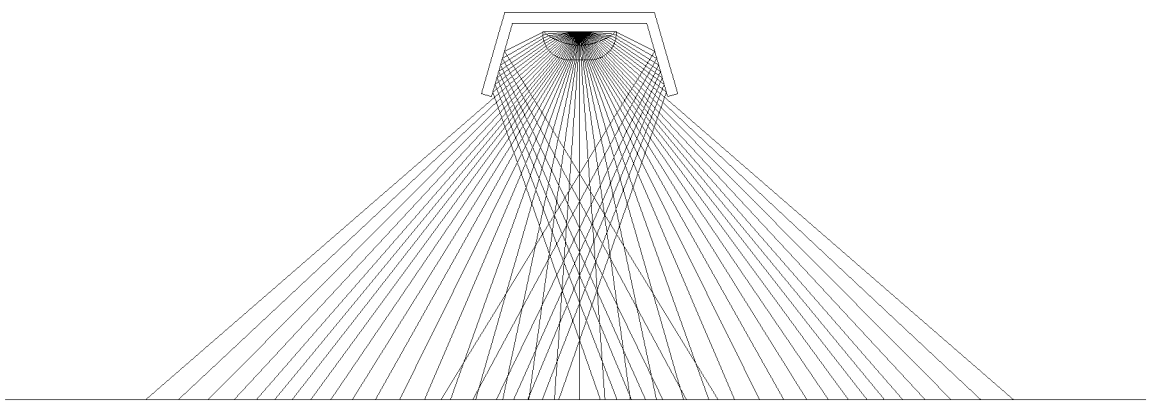
FIG. 17 is a schematic diagram showing the working principle of a plant illumination optical device according to yet another embodiment of the present invention.

The working principle of the plant illumination optical device provided by this embodiment is shown in FIG. 17. It can be known that the plant illumination optical device provided by this embodiment can significantly improve the illumination uniformity of the planting area.

The plant illumination optical device provided by this embodiment can be used to illuminate plants in a close range, thereby saving planting space and increasing planting area by providing more layers of planting areas within a unit height. Moreover, the out-of-edge light ray can be reflected back to the planting area. Further, the out-of-edge light ray can be reflected to the area with relatively weak luminous intensity in the planting area.

In summary, the present invention can effectively overcome the various drawbacks in the prior art and has a high industrial utilization value.

The above-described embodiments merely exemplify the principles and functions of the present invention and are not intended to limit the present invention. Modifications or variations of the above-described embodiments may be made by those skilled in the art without departing from the spirit and scope of the present invention. Therefore, all equivalent modifications or variations made those of ordinary skill in the art without departing from the spirit and technical idea of the present invention should be covered by the claims of the present invention.

What is claimed is:

1. A plant illumination optical device, comprising: two LED lamp bodies;
   wherein each of the two LED lamp bodies comprises a reflector and an LED lamp located at an inner side of the reflector; and an angle between central light rays of the two LED lamp bodies is adjustable, wherein
   the reflector has a symmetrical structure;
   each side of the reflector is divided into a first segment, a second segment, and a third segment that are connected to each other in sequence;
   the curvature of the first segment gradually decreases from a first value to a second value;
   the curvature of the second segment gradually increases from the second value to a third value;
   and the curvature of the third segment gradually decreases from the third value to a fourth value.

2. The plant illumination optical device according to claim 1, wherein the angle between the central light rays of the two LED lamps is in a range of 0°-20°.

3. The plant illumination optical device according to claim 1, wherein each of the two LED lamp bodies further comprises a lens, wherein the inner side surface of the lens is concave and has the uniform curvature, and the outer side surface of the lens has a symmetrical structure and has a non-uniform curvature.

4. The plant illumination optical device according to claim 3, wherein each side of the outer side of the lens comprises a fourth segment, a fifth segment, and a sixth segment that are connected to each other in sequence;
   the curvature of the fourth segment increases from a fifth value to a sixth value;
   the curvature of the fifth segment is first reduced from the sixth value and then increased to a seventh value; and
   the curvature of the sixth segment decreases from the seventh value to an eighth value.

5. The plant illumination optical device according to claim 1, wherein the LED lamp and the reflector are fixed on one side of an angle adjustable support through a housing; or, each of the two LED lamp bodies is fixed on one side of the support by an angle adjustable mechanism.

6. A plant cultivation device, comprising the plant illumination optical device of claim 1.

7. The plant cultivation device according to claim 6, wherein the angle between the central light rays of the two LED lamps is in a range of 0°-20°.

8. The plant cultivation device according to claim 6, wherein each of the two LED lamp bodies further comprises a lens.

9. The plant cultivation device according to claim 8, wherein the lens has a symmetrical structure, wherein the inner side surface of the lens is concave and has the uniform curvature, and the outer side surface of the lens has a symmetrical structure and has a non-uniform curvature.

10. The plant cultivation device according to claim 6, wherein the LED lamp and the reflector are fixed on one side of an angle adjustable support through a housing; or, each of the two LED lamp bodies is fixed on one side of the support by an angle adjustable mechanism.

11. The plant cultivation device according to claim 9, wherein each side of the outer side of the lens comprises a fourth segment, a fifth segment, and a sixth segment that are connected to each other in sequence;
   the curvature of the fourth segment increases from a fifth value to a sixth value;
   the curvature of the fifth segment is first reduced from the sixth value and then increased to a seventh value; and
   the curvature of the sixth segment decreases from the seventh value to an eighth value.

* * * * *